Patented June 21, 1949

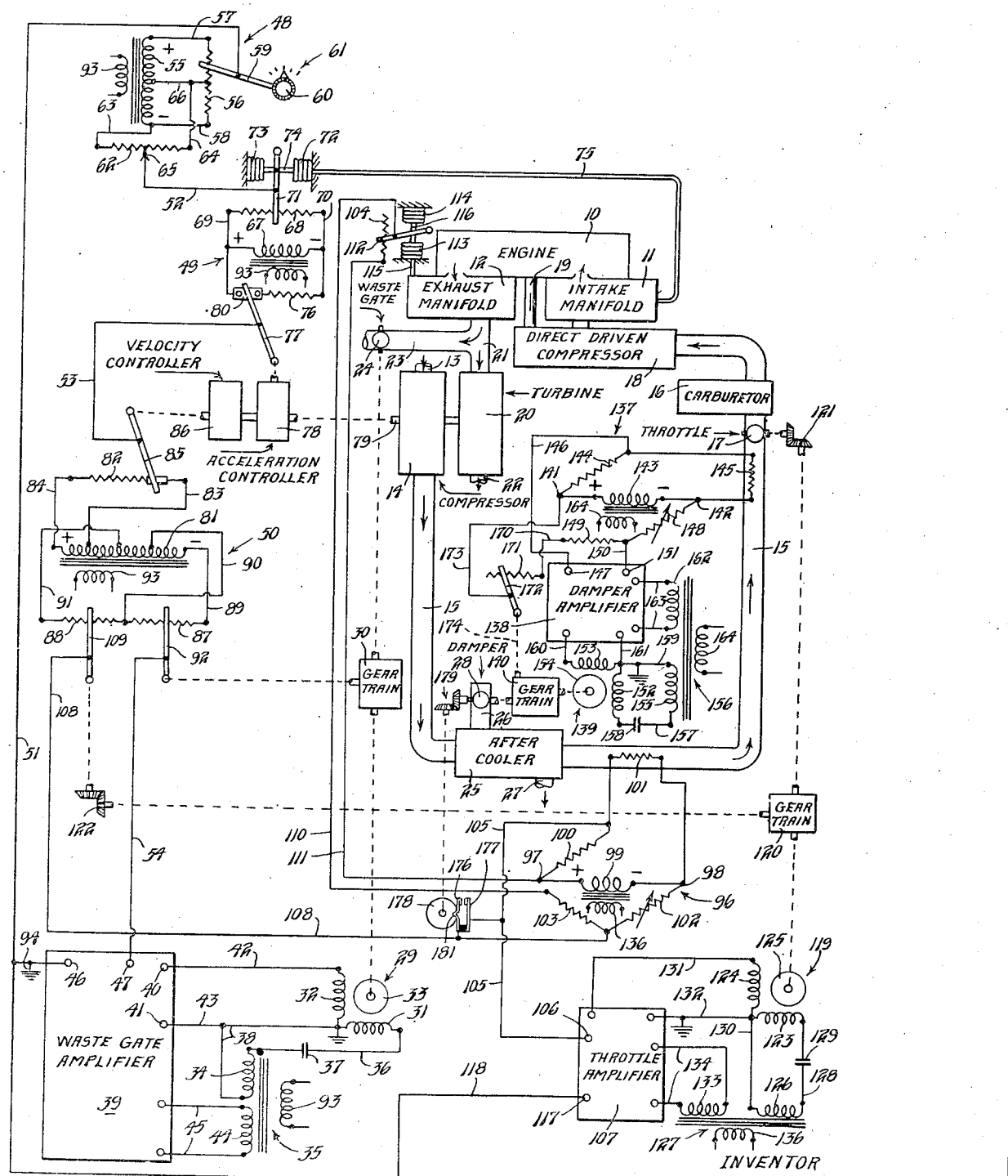

2,474,018

UNITED STATES PATENT OFFICE 2,474,018

SUPERCHARGER COMPRESSION TEMPERATURE CONTROL SYSTEM

Hubert T. Sparrow, Minneapolis, Minn., assignor to Minneapolis-Honeywell Regulator Company, Minneapolis, Minn., a corporation of Delaware Application April 28, 1945, Serial No. 590,819

12 Claims. (Cl. 60—13)

This invention relates to electrical control systems.

The invention more particularly relates to improvements in control systems for use in connection with the air induction system of an aircraft engine. Related systems for controlling the intake manifold or induction system pressure of such engines are disclosed in my co-pending application Serial No. 474,378, filed February 1, 1943, and in the co-pending application of Hubert T. Sparrow and Robert J. Kutzler, Serial No. 486,992, filed May 14, 1943, now Patent No. 2,466,282, to which attention is invited for comparative purposes.

The primary object of my present invention is to improve the operation of such systems by the addition thereto of control means of the following nature. A common form of induction system for an aircraft engine includes a compressor for delivering the air to the intake manifold and a turbine for driving the compressor, said turbine being driven by the exhaust gases from the engine. To control the pressure of the air admitted to the manifold the speed of the compressor is regulated by positioning a waste gate which varies the effect of the exhaust gases upon the turbine and hence the speed thereof. For positioning this waste gate, a control system is used wherein a reversible waste gate positioning motor is controlled to vary the position of the waste gate, and this motor is caused to rotate in proper direction by an electronic amplifier the operation of which is a function of the pressure in the intake manifold. A manual control is provided for selecting the pressure to be maintained after which the system functions to maintain that pressure within close limits.

The compression of the air for supplying the intake manifold, or to the carburetor, naturally causes this air to be heated, the degree to which the air temperature is raised depending of course on the temperature of the air supplied to the compressor and the rate at which the compressor is operated. Under most conditions, and particularly when the aircraft is flying at high or usual altitudes, the heat of compression is so great that a cooling device, commonly called an after cooler, is arranged at the high pressure side of the compressor and fresh air is taken into such cooler and passed in heat exchanging relation to the compressed air as it flows toward the carburetor and manifold, after which the cooling air is discharged to the atmosphere. However, in flying at the extremely high altitudes now possible, the low air temperatures frequently cause icing conditions at the carburetor and for this reason the air intake for the after cooler is provided with a damper which, when closed, cuts off this air permitting the heat of compression to raise the temperature of the air supplied to the carburetor and so eliminate such tendency toward the formation of ice. At present, this damper controlling the after cooler is manually controlled. It will be obvious from the above that a very substantial range of variation is permitted in the temperature of the air being supplied to the engine. Under some conditions, the air may, despite the closure of the after cooler, become so low as to cause icing. Furthermore, regardless of whether icing occurs or not, the variation in temperature renders it more difficult to control the effective horsepower of the engine since the power delivered by the engine is dependent upon the temperature of the air entering the intake manifold.

My invention has as its object to provide a control system for maintaining the temperature of the air entering the intake manifold at a substantially constant temperature.

Another object of my invention is to provide means for so controlling the temperature of the air entering the carburetor that icing will be prevented.

Another object of my invention is to control the throttle position in accordance with the temperature of the air between the after cooler and carburetor and in interrelation with the positioning of the waste gate in such manner that, with the damper fully closed, the necessary heat of compression to raise the air temperature to the required level will be supplied by partially closing the throttle, which action in reducing the manifold pressure, causes the waste gate to be moved toward a closed position to build up this pressure again to the selected value. The resulting increased speed of the turbine and compressor will then raise the heat of compression and temperature of the air supplied to the carburetor. This is the typical low altitude operation of the system but this "overlapping" control of the throttle and waste gate will be maintained only to a point at which the carburetor air reaches the control point after which the after cooler damper will be gradually opened in order to prevent the temperature form exceeding the desired value as higher altitudes are reached and more supercharging is required.

My invention has as a further object the provision of means for safeguarding the operation at low altitudes in the winter months. With the air at the intakes at a very low temperature it is obvious that, during the aforesaid overlapping control cycle, it is possible that the closing of the throttle and increased speed of the turbine and compressor might call for the closing of the waste gate to a point whereat the exhaust back pressure would rise above a value permitting efficient functioning of the engine. I therefore provide means responsive to the exhaust pressure for automatically running the throttle toward the open position when this pressure exceeds the safe value and thereby causing the waste gate to open slightly and reduce the back pressure.

With these and other objects in view, my invention resides in the novel system and arrangement of the parts thereof as hereinafter fully set forth and claimed.

The drawing is a diagrammatic view illustrating the application of my complete control system to an aircraft engine and its component parts.

Referring now more particularly to the drawing I have shown therein, in block diagram form, an aircraft engine 10 of the conventional internal combustion type, having an intake manifold 11 and exhaust manifold 12. The air to support combustion is taken from the atmosphere at an intake 13 and enters a compressor 14, commonly called the supercharger, from which it emerges under compression into a duct 15 leading to a carburetor 16 at the inlet of which there is a throttle 17. From the carburetor, the mixture of fuel and air is fed into another compressor 18 and thence into the intake manifold 11. The latter compressor 18 is directly driven from the engine, as indicated at 19, and hence compresses the mixture at a rate dependent wholly upon the speed of the engine.

The compressor 14 is driven by a turbine 20 to which the exhaust gases emerging from exhaust manifold 12 are led through a duct 21, and from which the gases are discharged at 22. Extending from the duct 21 is a by-pass duct 23 leading to atmosphere and wherein is located a valve, commonly termed the waste gate, indicated at 24. Obviously when the waste gate 24 is open, the resistance to passage of the exhaust gases through the by-pass duct 23 will be less than the resistance through the turbine 20 and the gases will therefore escape with little effect on the turbine. As the waste gate is progressively closed, more and more of the gases will be diverted through the turbine causing it to rotate at increasing speeds, and of course increasing the speed and compression ratio of the supercharging compressor 14. The position of the waste gate is thus seen to control the pressure of the air supplied to the carburetor 16.

An after cooler 25 is provided in the duct 15 and fresh air is taken from the atmosphere through an intake 26 and passed through the after cooler in heat exchanging relation to the compressed air flowing along the duct, the spent cooling air being then discharged at 27. The air is taken into the intake 26 through a scoop (not shown) so located on the aircraft that the air will be "rammed" into and through the cooler as a result of the movement of the aircraft and a damper or valve member 28 is located in the intake to control the amount of air passed through the cooler. This damper thus controls the cooling effect on the carburetor air, increasing the cooling to overcome the heat of compression occurring in the compressor 14 when the damper is opened, and decreasing the cooling effect as the damper is closed.

The waste gate 24 is positioned by a reversible motor 29 through a gear train 30, the motor being of the split-phase type having a pair of field windings 31 and 32, which are spaced ninety electrical degrees apart, and an armature 33. The field winding 31 is energized from the secondary winding 34 of a transformer 35 and the energizing circuit may be traced from the upper terminal of the secondary winding 34 through a phasing condenser 37, a conductor 36, field winding 31 and a conductor 38 back to the lower terminal of winding 34.

The other field winding 32 of the motor 29 is energized by and under control of an amplifier 39 having output terminals 40 and 41 connected by conductors 42, 38, and 43, respectively to the ends of the winding 32. The amplifier 39 is supplied with energy from a secondary winding 44 on the transformer 35 to which the amplifier is connected by conductors 45. The transformer 35 comprises a primary winding 93 in addition to the secondary windings 34 and 44, previously referred to. The primary winding 93 is connected to any suitable source of power (not shown).

The amplifier 39 has a pair of input terminals 46 and 47 and operates in such manner as to energize the motor field winding 32 with an alternating current the phase angle of which, with respect to the current in field winding 31, is determined by the phase of a signal potential applied to the input terminals. This amplifier, as well as others hereinafter described, may be of any suitable type operative as described. A typical amplifier of this type is that disclosed in Figure 1 of the co-pending application of Albert P. Upton, Serial No. 437,561, filed April 3, 1942, now Patent No. 2,423,534.

It is evident that if the current in the motor field winding 32, due to the phase of the signal at the amplifier input, leads the current supplied the other field winding 31 by the transformer 35 by ninety electrical degrees, the motor will rotate in one direction whereas, if this current in the winding 32 lags the current in winding 31 by the same degree, due to a reversal in phase of the amplifier exciting signal, the motor will rotate in the opposite direction. The phase angle of the amplifier signal input is thus seen to control the positioning of the waste gate 24 by the motor 29.

The signal potential applied to the amplifier 39 is determined by the electrical conditions in a compound network which consists of three series connected networks 48, 49, and 50. The circuit from amplifier input terminal 46 may be traced through a conductor 51, the first network 48, a conductor 52, the second network 49, a conductor 53, the third network 50 and a conductor 54 back to the input terminal 47.

The network 48 comprises a transformer secondary winding 55 across the terminals of which is connected a slidewire resistance 56 by means of conductors 57 and 58. The aforesaid conductor 51 is connected to a slider 59 which is arranged to traverse the resistance 56 under control of a knob 60, this resistance and slider constituting a control point adjuster 61 for selecting the intake manifold pressure. Another resistance 62 has its terminals connected across one half the transformer winding 55 by conductors 63 and 64, one of which is connected to the lower end of the winding and the other to a center tap on the winding. A slider 65 cooperates with the resistance 82 to form a calibrating potentiometer and the conductor 52 is connected to this slider.

The center tap of the transformer winding 55 is connected by conductor 66 to the center of the resistance 56 in order to provide a more uniform potential gradient across resistor 56. This connection does not otherwise affect the operation of this network.

The network 49 comprises a transformer secondary winding 67 across whose terminals is connected a slidewire resistance 68 by conductors 69 and 70. A slider 71, connected to the conductor 52 cooperates with the resistance 68 and this slider and resistance form a main controller unit which is operated and positioned in accordance with the absolute pressure existing in the intake manifold 11. For this purpose opposed bellows 72 and 73 are supported adjacent the slider 71 and have their free ends connected thereto as at 74. One bellows 72 is connected by a pressure take-off duct 75 to the intake manifold 11, or other suitable point on the induction system of the engine, while the other bellows 73 is evacuated and compensates in well known manner for atmospheric pressure changes. The rise and fall of the pressure in the intake manifold 11 will thus obviously position the slider 71 along the resistance 68.

Another slidewire resistance 76 is connected as shown across the secondary winding 67 and a slider 77, connected to conductor 53, is arranged to cooperate with this resistance. The resistance and slider form an acceleration compensating controller and for this purpose the slider 77 is arranged to be positioned in accordance with the rate of the acceleration of the turbine 20 by means of any suitable acceleration responsive device 78 connected to the turbine shaft 79. This device 78 may be of the type shown in my sole application previously referred to, and suffice it to say herein that this device is operative to retain the slider 77 in the position shown as long as the turbine rotates at a certain speed. Should the turbine accelerate sharply the slider 77 will be moved to the right along the resistance 76. A contact 80 provides a "dead spot" on which the slider 77 normally rests so that minor acceleration of the turbine will have no effect on the control system.

The network 50 comprises a multi-tapped transformer secondary winding 81. A slidewire resistance 82 is connected by conductors 84 and 83 to the left-hand terminal of the winding and an adjacent tap thereon. A slider 85 connected to the conductor 53 cooperates with the resistance 82 to provide a velocity or overspeed compensating controller. The slider 85 is accordingly positioned in accordance with the speed of the turbine by means of any suitable velocity responsive device 86 connected to the turbine shaft 79. A typical such device is described in detail in my sole co-pending application previously mentioned.

The network 50 also includes a slidewire resistance 87 and a slidewire resistance 88 connected at their adjacent ends. One end of resistance 87 is connected by a conductor 89 to the right-hand end of the winding 81, the junction of the resistances is connected by a conductor 90 to an adjacent tap, and the other end of the resistance 88 is connected by conductor 91 to a tap between those to which conductors 83 and 90 are connected. A slider 92 connected to the conductor 54 cooperates with the resistance 87 and together with this resistance forms a rebalancing or waste gate follow-up potentiometer. The slider 92 is positioned by the motor 29 through the gear train 30 as the waste gate 24 is positioned. The resistance 88 may for the moment be ignored and its function will be later described.

The various secondary windings 55, 67, and 81, as well as others later to be described, may all be on the same transformer, which may be the transformer 35 or any other having its primary (not shown) connected to the same source of supply as the primary of transformer 35. To simplify the illustration, the various secondaries have been shown in association with the elements of the system energized by them and to bring out that they may all be part of the same transformer, the primary winding 93 of transformer 35 has been shown in connection with each secondary winding. The primary winding 93 may be connected to any suitable source of power, not shown. Regardless of whether the secondary windings 55, 67, and 81 are part of transformer 35 or of other transformers connected to the same source of power, it is evident that the alternating potentials of all of the secondary windings will be in phase with each other and the alternating signal potential applied to the amplifier input terminals 46 and 47 will be the algebraic sum of the potentials produced in the networks 48, 49, and 50.

The system as thus far described constitutes the pressure control, per se, and its operation will now be described briefly. For convenience sake, the instantaneous voltage conditions in the networks 48, 49, and 50 on the half cycle at which the respective ends of the windings 55, 67 and 81 are of the polarity indicated by the legends in the drawing, are taken as an example, and for a reference potential the conductor 51 leading to the amplifier input terminal 46 is grounded at 94.

In the network 48 as shown the slider 59 is above the center of resistance 56 and it is accordingly positive with respect to the center tap of the winding 55. On the other hand the slider 65 is at a center position and hence is negative with respect to this center tap. This network accordingly introduces a potential in the series circuit to the amplifier input terminals such that the conductor 52 is at a negative potential with respect to grounded conductor 51.

In the network 49, the slider 77 is obviously positive with respect to the slider 71 and conductor 52 and the potential of slider 77 with respect to ground depends upon the relative magnitudes of the opposing potentials thus introduced by the respective networks 48 and 49. For convenience, it may be assumed that the positive voltage between conductors 53 and 52 introduced by the network 49 is larger than the negative voltage between conductors 52 and 51 from network 48 and that the conductor 53 is thus positive with respect to ground by an amount equal to the difference in such magnitudes.

Considering finally the network 50, it will be evident that the slider 85 is at the same potential as the conductor 53 and being positioned at its extreme right position along the resistance 82, the conductor 83 is at the same potential. The left-hand end of the resistance 87 is so connected by conductor 90 to the winding 81 that it is negative with respect to conductor 83. With the slider 92 in the position shown at an intermediate point of resistance 87, the conductor 54 is then obviously negative with respect to the slider 85 and conductor 53 and the amount of this potential difference will depend upon the voltages of the sections of the winding 81 between its various taps.

Now it may be assumed that the negative voltage between conductor 54 and conductor 53 is equal in magnitude to the positive voltage between conductor 53 and ground and therefore that the compound network, including the three series connected networks 48, 49, and 50 is balanced. Under this condition no signal will be applied to the amplifier 39, no energy will be supplied to the motor field winding 32 and the waste gate 24 will remain stationary. In the positions of the various controls as here shown the waste gate is partially closed and the air compression is at an intermediate value.

Now should the air pressure in the intake manifold 11 fall, due for example to an ascent of the aircraft to a higher level, the bellows 72 as it collapses will move the slider 71 to the right along resistance 68 and increase the magnitude of the previously mentioned positive voltage between conductors 53 and 52. Other factors remaining equal, the terminal 47 of the amplifier 39 will now be negative with respect to the terminal 46 and a signal will be applied to the amplifier such as to excite the motor field winding 32 and rotate the motor 29 in the proper direction to move the waste gate 24 toward closed position. This will of course build up the pressure in the intake manifold. At the same time the slider 92 will be moved toward the right along resistance 87 by the gear train 30 and will gradually increase the negative voltage between sliders 92 and 85 to rebalance the compound network, causing the motor to stop and the waste gate to be left at a new, slightly more closed position. Further details of this operation in response to the differences in pressure will, it is believed, be apparent to those skilled in the art without additional description herein.

In a similar manner, the potentials introduced into the series circuit will be varied by operation of the sliders 59, 71, and 85. The manual positioning of the slider 59 by knob 60 will permit the balance point of the circuit to be shifted to select the value of manifold pressure to be maintained by the controller slider 71 while overacceleration or overspeeding of the turbine will cause the sliders 77 and 85 to introduce potentials such that the waste gate 24 will be opened slightly to reduce acceleration and speed to safe values. The latter two operations are obvious entirely automatic in character and serve as safeguards to the proper operation of the system.

As thus far described and aside from the resistance 88 in the network 50, the system is essentially identical to that disclosed and claimed in the Sparrow and Kutzler application Serial No. 486,992 hereinbefore mentioned.

In accordance with my present invention I provide also an additional network designated generally at 96 which is connected in series with the compound network including the networks 48, 49, and 50, and which controls the throttle 17 as will now be described in detail.

This network 96 is a bridge circuit having two parallel branches and a pair of input terminals 97 and 98 to which are connected, as shown, the ends of a transformer secondary winding 99 for supplying the bridge with an alternating potential. One branch of the bridge includes a resistance 100 and a temperature sensing and responsive bulb 101 which is located in the duct 15 in such manner as to be exposed to the air supplied the carburetor 16 after such air passes through the after cooler 25. The bulb 101 is actually a resistance which varies in value according to the temperature of this air. The other branch of the bridge comprises a variable resistance 102, a fixed resistance 103 and another variable resistance 104.

The resistances 100 and 101 are connected in series to form one branch of the bridge extending between the terminals 97 and 98 and from the junction between these resistances there leads a conductor 105 which is connected to an input terminal 106 of an amplifier 107, hereinafter called the throttle amplifier. The resistances 102 and 103 are also connected in series and from their junction leads a conductor 108 which is connected to a slider 109 cooperating with the previously described resistance 88 forming a part of the network 50. This slider 109 and resistance 88 together form a throttle follow-up or rebalancing potentiometer as will presently appear.

One end of the branch formed by the series connected resistances 102 and 103 is connected to one terminal 98 of the bridge 96 and leading from the other end and the other terminal 97, respectively, are conductors 110 and 111. The conductor 111 is connected to one end of the resistance 104, which is of the rheostat type, and the conductor 110 is connected to a slider 112 which cooperates with the resistance 104 to form an exhaust back pressure controller. Two bellows 113 and 114 are supported at opposite sides of the slider 112. The bellows 113 is connected by a pressure take-off duct 115 to the exhaust manifold 12 so that the position of the bellows will directly reflect the pressure of the exhaust gases. The other bellows 114 is evacuated and serves to compensate for changes in atomspheric pressure. The bellows are connected together and to the slider 112 as shown at 116 so that the same will be positioned along the resistance 104 by the exhaust pressure and will insert added resistance into the lower branch of the bridge 96 as this pressure increases.

The amplifier 107 is similar to the amplifier 39 controlling the waste gate and has, in addition to the input terminal 106 another input terminal 117 which is connected to the conductor 51 by a conductor 118. The amplifier 107 controls the operation of a throttle positioning motor 119 which is connected through a gear train 120 and gears 121 to the throttle 17 and which also operates the follow-up potentiometer slider 109 through a connection to the gear train 120 including, as here shown, the gears 122. The motor 119 is of the reversible split-phase type, like the waste gate motor 29, having two field windings 123 and 124, displaced in phase by ninety electrical degrees, and an armature 125. The field winding 123 is energized by one secondary winding 126 of a transformer 127, the energizing circuit being traceable from one end of the secondary winding 126 through a conductor 128, a condenser 129, the field winding 123 and a conductor 130 back to the other end of winding 126. The other field winding 124 is energized by the amplifier 107 by means of conductors 131 and 132 which connect the winding across the output terminals of the amplifier. Another secondary winding 133 on the transformer 127 energizes the amplifier through conductors 134 and the primary 135 of the transformer is of course connected to the common source of supply to maintain proper phase relationships with other parts of the system.

The amplifier 107 supplies the motor field winding 124 with alternating current potential which either leads or lags the current in the field winding 123 by ninety electrical degrees to cause corresponding opposite rotation of the motor 119. The direction of such rotation depends upon the phase of the signal potential applied to the input terminals 106 and 117 of the amplifier and this is in turn a function of the balance of the compound network including networks 48, 49 and 50 and bridge 96.

The series excitation circuit for the throttle amplifier 107 may be traced from its input terminal 117 through the conductor 118, the conductor 51, the network 48, the conductor 52, the network 49, the conductor 53, the network 50, the conductor 108, the bridge 96, and the conductor 105 to the other input terminal 106.

I also provide a damper positioning system including a separate bridge circuit 137, an amplifier 138, hereafter called the damper amplifier, and reversible motor 139 which adjusts the damper 28 through a gear train 140.

The bridge 137 comprises two parallel branches connected across input terminals 141 and 142 to which are connected the ends of a transformer secondary winding 143. One branch of the bridge comprises a fixed resistance 144 and a temperature responsive resistance bulb 145 which is located in duct 15 in order to be influenced by the temperature of the air supplied to the carburetor 16 after the air passes through the after cooler 25. The resistances 144 and 145 are connected in series across the terminals 141 and 142 and from their junction there leads a conductor 146 to one input terminal 147 of the amplifier 138. The other branch of the bridge comprises a variable resistance 148 connected at one end to the terminal 142 and at the other end connected to one end of a fixed resistance 149 which is connected through conductor 170 to one terminal of a resistance 171 with which cooperates a slider 172. The slider 172 is connected by conductor 173 to terminal 141 and is operatively connected through a shaft 174 to gear train 140. Thus, slider 172 is positioned by motor 139 and cooperates with resistor 171 to rebalance bridge 137. The junction between the resistances 148 and 149 is connected by a conductor 150 to the other input terminal 151 of the amplifier 138.

A switch consisting of switch blades 176 and 177 is provided for shorting the bridge 96 out of the throttle network when the after cooler damper is not in closed position. Switch blade 177 is fixed while switch blade 176 is movably positioned by a cam 178. Cam 178 is driven through gearing 179 by the gear train 140 and hence by motor 139. Cam 178 is provided with a recessed portion 181 in its cam face which cooperates with a cam follower portion of switch blade 176. Normally, this cam follower portion of switch blade 176 engages the normal raised portion of the cam 178 so that switch blades 176 and 177 are held in contact making engagement against the bias of switch blade 176. Upon the after cooler damper 28 being closed the recessed portion 181 of the cam moves adjacent the cam follower portion of switch blade 176 to permit switch blade 176 to move away from switch blade 177. Switch blade 176 is connected to conductor 108 extending from slider 109 while switch blade 177 is connected to conductor 105 extending to terminal 106 of the throttle amplifier so that when switch blades 176 and 177 are engaged, slider 109 is connected directly to the amplifier instead of through bridge 96.

The motor 139 is again of the split phase type having two field windings 152 and 153 displaced by ninety electrical degrees, and an armature 154. One winding 152 is energized by a secondary winding 155 of a transformer 156 and the energizing circuit may be traced from one end of winding 155 through a conductor 157, a phase shifting condenser 158, the field winding 152 and a conductor 159 back to the other end of the secondary winding. The other field winding 153 is energized by the amplifier 138 by conductors 160 and 161. Another secondary winding 162 on the transformer 156 supplies the amplifier through conductors 163, and the primary winding 164 of the transformer is again connected to the common source of supply for the entire system.

The secondary windings 99 and 143 for the respective bridges 96 and 137 may be arranged on the associated transformers 127 and 156, or in any other convenient fashion may be supplied with current of the necessary phase relation. For purposes of illustration, primary windings 136 and 164 have been repeated in connection with secondary windings 99 and 143, respectively, to indicate these secondaries as being part of transformers 127 and 156, respectively.

The excitation circuit for the damper amplifier 138 may be traced from its input terminal 147 through the conductor 146, bridge 137, and the conductor 150 to the other input terminal 151.

*Operation*

As has been stated hereinbefore, the heat of compression in the compressor 14 heats the air supplied to the carburetor 16 and to limit this heat and prevent preignition or other undesirable effects in the engine, the after cooler 25 is provided. However, too much cooling is not desirable since, particularly when flying at high altitudes, or at lower levels during the winter months, the temperature of the air at the intake 13 of the compressor will be very low and the air at the carburetor might be so cold as to cause the occurrence of icing conditions.

My system as above described in detail accordingly provides means for regulating the temperature of the air supplied to the carburetor in the manner now to be set out.

It is assumed at the outset that the damper 28 in the after cooler intake 26 is closed, as it usually will be when the aircraft takes off. The waste gate 24 is also assumed to be in a partially closed position, as has been described. With the various elements of the network in the positions previously considered, this slider 85 and conductor 83 are positive with respect to the grounded input terminal 117 of the throttle amplifier just as they are positive with respect to the input terminal 46 of the waste gate amplifier 39. In the case of the waste gate network, this voltage was balanced out by the negative voltage between slider 92 and conductor 83. In the case of the throttle network, however, this negative voltage is less since slider 109 is clearly more positive than slider 92. Thus, slider 109 and conductor 108 are positive with respect to the grounded terminal 117 of the throttle amplifier. This voltage is balanced out by the voltage supplied by the bridge 96 as will be presently explained.

The bridge 96 is initially set up to balance (with the resistance 104 at a normal value as later pointed out) when the control point of the temperature bulb 101 is reached, or in other words, when the temperature of the air in the duct 15 leading from the after cooler 25 to the carburetor 16 is at or near its desired value. This bridge when balanced obviously will introduce no potential into the series circuit leading from the amplifier terminal 117, through the networks 48, 49, and 50 and through the bridge 96 to the other input terminal 106. This being true then, while the bridge 96 remains in balance, the potential at the amplifier input terminal 106 will be the same as that at slider 109 so that the only signal that exists for exciting the throttle amplifier 107 is that produced by networks 48, 49, and 50.

Under the conditions assumed, however, the temperature of the air in the duct 15 is below the desired optimum value. The effect of this is to make the potential of conductor 105 negative with respect to conductor 108. In other words, the voltage across the bridge is opposite in sense to the voltage between conductor 108 and the grounded terminal 117 of the throttle amplifier. Under the conditions assumed, this unbalance voltage is exactly equal to the voltage between conductor 108 and grounded terminal 117 so that no voltage is impressed upon the input terminals 106 and 117 of the throttle amplifier. The throttle thus remains in the position indicated which is intermediate its open and full closed positions. Because of this, the pressure in the intake manifold is less than it would be were the throttle wide open. Since motor 29 positioning the waste gate is controlled by the intake manifold pressure, it will be obvious that the turbo supercharger is operating to produce a higher discharge pressure than would otherwise be necessary were the throttle fully open. Since, the compression of the air causes the same to be heated, the air is warmer than it otherwise would be. In a normal flight, this will result in the air rapidly warming up. As it does, the unbalance voltage of the bridge 96 decreases. This has the effect of making input terminal 106 positive with respect to the grounded input terminal 117 of the throttle amplifier. This in turn causes the motor 119 to be driven in such a direction as to move the throttle towards open position. As the throttle is moved to open position, the arm 109 is moved to the right or, in other words, to a more negative position with respect to slider 85. This results in rebalancing of the bridge.

As the throttle is thus moved towards open position, the manifold pressure increases. This operates through the intake manifold pressure responsive bellows 72 and slider 71 to move the waste gate towards open position, that is, to decrease the compressing effect of the compressor. Under normal conditions, this will continue until the throttle is wide open.

In the operation assumed so far, the bridge 137 has been unbalanced in such a direction as to tend to cause the motor 139 to drive damper 28 towards closed position. Since this damper is in fully closed position, no movement of the motor was possible. As the temperature of the air leaving the after cooler approaches the value at which the throttle is wide open, however, the bridge 137 approaches a balanced condition. Upon further rise in the temperature of the air, the bridge becomes unbalanced in the opposite direction. This results in a signal being supplied to the amplifier which is of such phase as to cause motor 139 to drive the damper 28 towards open position and thereby initiate operation of the after cooler. As the damper is moved towards open position, the slider 172 is moved to the right so as to decrease the resistance in the lower left-hand leg of bridge 137. This compensates for the increase in resistance of the resistor 145 in the upper right-hand leg so as to rebalance the bridge when the damper 28 reaches a position corresponding to the temperature of bulb 145. Thereafter, the bridge 137 will remain in control as long as normal flight conditions are encountered. The effect of this bridge acting through motor 139 is to so position the damper associated with the after cooler as to maintain a constant desired temperature of the air supplied to the intake manifold. This results in greatly improved control of the output of the engine, in that the effect of variations in temperature of the air supplied to the carburetor is eliminated.

As soon as the damper 28 moves away from closed position, switch blade 176 moves into engagement with switch blade 177. When this happens, a connection is established directly from slider 109 through conductor 108 and a portion of conductor 105 to the input terminal 106 of the throttle amplifier. In other words, a short circuit is established across the output terminals of the bridge 96 so that further variations in the temperature of element 101 of this bridge will have no effect upon the operation of the throttle motor. The position of the throttle motor will thereafter be determined solely by the bridges 48, 49, and 50.

It will be clear that during normal flight conditions, the temperature of the air is ordinarily regulated by the arrangement including bridge 137 and after cooler damper motor 139, the after cooler damper 28 being variably positioned to maintain this temperature constant. It is only when the temperature of the air drops to a value at which the after cooler damper 28 is fully closed that the bridge 96 is permitted to affect the position of throttle motor and cause the throttle to assume a partially closed position despite operation of the compressor. Occasionally, conditions may become so extreme that the throttle position which is being maintained for temperature maintenance purposes is such as to cause excessive operation of the compressor. Under these conditions, the pressure of the exhaust gas will rise to a point such as to cause upward movement of slider 112 with respect to resistor 104. This increases the resistance in the lower left-hand leg of bridge 96 so as to have the same effect as an increase in the resistance of resistor 101. In other words, this tends to cause conductor 105 to be less negative with respect to conductor 108. If the throttle amplifier network were previously balanced, the effect of this would be to make terminal 106 positive with respect to terminal 117. This, it will be recalled, tends to move the throttle towards open position. This will in turn result in an increase in the intake manifold pressure to in turn cause an opening movement of the waste gate. Thus, the exhaust manifold pressure controller including slider 112 and resistor 104 effective to act as a limit control to limit the amount of throttle closing movement when the effect of such movement is to overload the turbine driven compressor.

The variable resistances 102 and 148 in the respective bridges 96 and 137 permit the initial setting up of the balance points of these bridges. Adjustment of these resistances will have a similar effect to that of the variation of the temperature responsive bulbs 101 and 145 and enables the control points of the bolts to be set at the desired temperature.

In the operation which has been described so far, it is presumed that the setting of the pressure selector network 48 is such as to require the operation of the turbo supercharger. Under some conditions of flight, this will not be required. As the slider 59 of the manual pressure selector 48 is moved upwardly, the potential of conductor 51 and hence the grounded terminal 94 is raised with respect to that of conductor 54 and terminal 47 of the waste gate amplifier. A positive voltage between terminals 46 and 47, during the conductive half cycle being considered, results in a voltage being supplied to winding 32 of motor 29 of such phase as to cause the waste gate to be driven towards open position. This, as previously explained, is accompanied by the movement of slider 92 to the left and a resulting increase in the potential of conductor 54 and terminal 47 with respect to conductor 51 and terminal 46. In other words, the movement of slider 92 to the left results in a rebalancing of the bridge. It will be readily apparent that upon slider 59 being moved sufficiently far towards the upper terminal of resistor 56, the waste gate will be in fully open position. Let it be assumed that the conditions are such as not to require movement of the throttle towards closed position in order to heat the air. Under these conditions, the throttle will be in fully closed position at the time that the waste gate reaches open position. During the entire time that the waste gate has been in partially closed position, a voltage has existed between slider 109 and hence terminal 106 of the throttle amplifier with respect to terminal 117, which voltage is of such phase as to tend to run the throttle towards open position. Since the throttle was already in fully open position, however, such movement was prevented. Upon the waste gate reaching a fully open position, however, the potentials of slider 92 and 109 become the same and no voltage is impressed on the throttle amplifier. Upon slider 59 of the manual controller 48 being moved farther towards the upper end of resistor 56 to call for still lower manifold pressures, slider 109 becomes positive during the conductive half cycle being considered, with respect to conductor 51 and hence with respect to terminal 117. In other words, a voltage is impressed on the throttle amplifier which is of such phase as to tend to cause the throttle motor to run towards closed position. This in turn causes movement of the slider 109 to the left. Thus, as long as the damper 28 of the after cooler can maintain the air at the desired temperature, the selection of lower and lower manifold pressures will result in the waste gate being moved to open position and then in the throttle being moved towards closed position. When, however, the damper 28 reaches fully closed position, the bridge 96 is connected into the circuit of the throttle amplifier so as to supply an additional voltage to cause a displacement of the throttle from that position called for by the manual controller 48. Under these conditions, the throttle may be in a partially closed position even though the waste gate be in a fully closed position. This gives the action previously described.

It will be seen that I have provided a novel system for controlling the pressure and temperature of the air supplied to the intake manifold of an internal combustion engine. With my system, the damper of the after cooler is so controlled as to maintain the temperature constant. When the requirements for heating of the air are such that they cannot be met by a closing of the after cooler damper, then the throttle is moved towards closed position to compel an increase in the compressing effect of the compressor and thereby to warm the air.

While I have shown a specific embodiment of my invention, it is to be understood that this is for purposes of illustration only and that my invention is limited solely by the scope of the appended claims.

I claim as my invention:

1. In combination, an internal combustion engine having an intake manifold, a compressor for supplying air under pressure to said manifold, a cooler for removing the heat of compression, a throttle for regulating the flow of air from said compressor to said intake manifold, and means responsive to a continuing reduction in the temperature of the air for first reducing the cooling effect of said cooler and then increasing the throttling action of said throttle.

2. In combination, an internal combustion engine having an intake manifold, a compressor for supplying air under pressure to said manifold, a cooler for removing the heat of compression, a throttle for regulating the flow of air from said compressor to said intake manifold, means responsive to a continuing reduction in the temperature of the air for first reducing the cooling effect of said cooler and then increasing the throttling action of said throttle; and means for increasing the compressing effect of said compressor upon such an increase in the throttling action of said throttle.

3. In combination, an internal combustion engine having an intake manifold, a compressor for supplying air under pressure to said manifold, a cooler for removing the heat of compression, a throttle for regulating the flow of air from said compressor to said intake manifold, means responsive to the pressure of the air supplied to said intake manifold for regulating the position of said throttle, means responsive to the temperature of said air for regulating said cooler so as to tend to maintain said air at a predetermined temperature, and means responsive to the temperature of said air effective when said temperature drops to a value below said predetermined temperature to move said throttle to a position more nearly closed than called for by said pressure responsive means.

4. In combination, an internal combustion engine having an intake manifold, a compressor for supplying air under pressure to said manifold, a cooler for removing the heat of compression, a throttle for regulating the flow of air from said compressor to said intake manifold, means responsive to the pressure of the air supplied to said intake manifold for regulating the position of said throttle, means responsive to the temperature of said air for regulating said cooler so as to tend to maintain said air at a predetermined temperature, means responsive to the temperature of said air effective when said temperature drops to a value below said predetermined temperature to move said throttle to a position more nearly closed than called for by said pressure responsive means, and means to prevent said last named means from affecting the position of said throttle until said cooler is rendered completely ineffective to cool said air.

5. In combination, an internal combustion engine having an intake manifold, a compressor for supplying air under pressure to said manifold, a cooler for removing the heat of compression, a throttle for regulating the flow of air from said compressor to said intake manifold, means responsive to the pressure of the air supplied to said intake manifold for regulating the position of said throttle, means responsive to the temperature of said air for regulating said cooler so as to tend to maintain said air at a predetermined temperature, and means responsive to the temperature of said air to shift the control point of said pressure responsive means in the direction of throttle closed position.

6. Apparatus for controlling the pressure and temperature of the air supplied to the intake manifold of an internal combustion engine having an engine exhaust driven compressor for supplying the air and a throttle controlling the flow of air to the manifold; comprising in combination, means for controlling the compressing effect of the compressor in accordance with a pressure condition affected by said compressor, and means for moving the throttle towards closed position upon a decrease in the temperature of the air supplied to the intake manifold to thereby call for an increase in the compressing effect of the compressor to heat the air by the heat of compression, said last mentioned means including means responsive to the pressure of the exhaust for limiting the control of the air temperature over said throttle.

7. Electrical apparatus for controlling the pressure and temperature of the air supplied to the intake manifold of an internal combustion engine having a compressor and turbine driven by exhaust pressure, and a throttle controlling the flow of air from compressor to manifold, comprising in combination, means for controlling the compressing effect of the compressor, electrical means for adjusting said compressing effect controlling means, means including an electrical circuit for controlling said electrical means to vary the compressing effect of the compressor in accordance with the pressure in the intake manifold of the engine, means for positioning the throttle, means comprising another electrical circuit including a part of the previously named circuit and having a part responsive to the temperature of the air supplied by the compressor for adjusting the throttle positioning means and thereby varying the pressure in the manifold and influencing the operation of said compressing effect controlling means, and said last mentioned electrical circuit including also a means responsive to the exhaust pressure of the engine for limiting the influence of said circuit over the compressing effect controlling means.

8. Apparatus for controlling the pressure and temperature of the air supplied to the carburetor of an internal combustion engine of the type having a compressor for supplying such air and a cooler for cooling the air after compression, comprising in combination, means for adjusting the compressing effect of the compressor in accordance with the pressure of the air supplied to the carburetor, throttling means responsive to the temperature of this air falling below a certain value for throttling the air supplied to the carburetor and calling for a compensating increase in the compression effect of the compressor to thereby heat the air by the added heat of compression, and separate means responsive to an increase in temperature of the air above said certain value for setting the cooler into operation to cool the air.

9. Apparatus for controlling the pressure and temperature of the air supplied to the intake manifold of an internal combustion engine of the type having a compressor for supplying such air, throttling means for controlling the flow of air to the manifold, and a cooler for cooling the air after compression, comprising in combination, means for adjusting the compressing effect of the compressor in accordance with the pressure of the air supplied to the manifold, means for so positioning the throttling means in response to a decrease in temperature of this air below a certain value as to throttle the air supplied to the manifold and therefore cause said adjusting means to call for a compensating increase in the compressing effect of the compressor to thereby heat the air by the added heat of compression, and separate means responsive to an increase in temperature of the air above said certain value for adjusting the cooler to cool the air.

10. Electrical apparatus for controlling the pressure and temperature of the air supplied to the intake manifold of an internal combustion engine of the type having a compressor for supplying such air, throttling means for controlling the admission of the air to the manifold, and a cooler for cooling the air after compression, comprising in combination, means for adjusting the compressing effect of the compressor in accordance with the pressure of the air supplied to the manifold, means for so positioning the throttling means in response to the decrease in the temperature of this air below a certain value as to throttle the air supplied to the manifold and initiate a compensating increase in the compression ratio of the compressor to thereby heat the air by the added heat of compression, said positioning means for said throttling means being operative to remove the throttling effect when the temperature of the air exceeds said certain value, and other electrical means operative when the temperature of the air exceeds said certain value for adjusting the said cooler to cool the air.

11. Apparatus for controlling the pressure and temperature of the air supplied to the intake manifold of an internal combustion engine of the type having a compressor for supplying the air, a throttling means for controlling the flow of the air from compressor to manifold, and a cooler for cooling the air after compression, comprising in combination, means for adjusting the compressing effect of the compressor in accordance with the pressure of the air supplied to the manifold, means for so positioning the said throttling means when the temperature of this air falls below a certain value as to throttle the air supplied to the manifold and thus cause said adjusting means to call for a compensating increase in the compressing effect of the compressor to heat the air by the added heat of compression, the said cooler having a damper for adjusting its cooling effect on the air, and means operated in response to an increase in the temperature of the air above said certain value for opening said damper.

12. Electrical apparatus for controlling the pressure and temperature of the air supplied to the intake manifold of an internal combustion engine of the type having a compressor for supplying the air, a throttle for controlling the admission of the air to the manifold, and a cooler for cooling the air after compression, comprising in combination, means for adjusting the compressing effect of the compressor in accordance with the pressure of the air supplied to the manifold, means for so positioning the throttle as the temperature of this air falls below a certain value as to reduce the admission of the air to the manifold and therefore cause said adjusting means to call for a compensating increase in the compressing effect of the compressor to heat the air by the added heat of compression, the said cooler having a damper for controlling the flow of fresh air therethrough and thereby adjusting its cooling effect on the air supplied to the manifold, electrical motor means for adjusting the damper, and means responsive to the temperature of the air supplied to the manifold for opening said damper when the temperature exceeds said certain value.

HUBERT T. SPARROW.

REFERENCES CITED

The following references are of record in the file of this patent:

UNITED STATES PATENTS

| Number | Name | Date |
|---|---|---|
| 1,371,444 | Sherbondy | Mar. 15, 1921 |
| 2,275,317 | Ryder | Mar. 3, 1942 |
| 2,305,810 | Müller | Dec. 22, 1942 |
| 2,353,201 | Talbot | July 11, 1944 |
| 2,372,272 | Helmore | Mar. 27, 1945 |
| 2,376,143 | Edwards et al. | May 15, 1945 |
| 2,383,563 | Pugh et al. | Aug. 28, 1945 |
| 2,388,350 | Taylor | Nov. 6, 1945 |
| 2,403,398 | Reggio | July 2, 1946 |

FOREIGN PATENTS

| Number | Country | Date |
|---|---|---|
| 458,350 | Great Britain | Dec. 17, 1936 |

Certificate of Correction

Patent No. 2,474,018                                                                                           June 21, 1949

HUBERT T. SPARROW

It is hereby certified that errors appear in the printed specification of the above numbered patent requiring correction as follows:

Column 2, line 50, for the word "form" read *from*; column 10, line 32, strike out "through the conductor 146, bridge 137, and the" and insert the same in line 34, after "147";

and that the said Letters Patent should be read with these corrections therein that the same may conform to the record of the case in the Patent Office.

Signed and sealed this 7th day of February, A. D. 1950.

[SEAL]

THOMAS F. MURPHY,
*Assistant Commissioner of Patents.*